Mar. 3, 1925.                F. W. WOODBINE                1,528,730
                             INSULATING HANDLE
                             Filed May 16, 1924
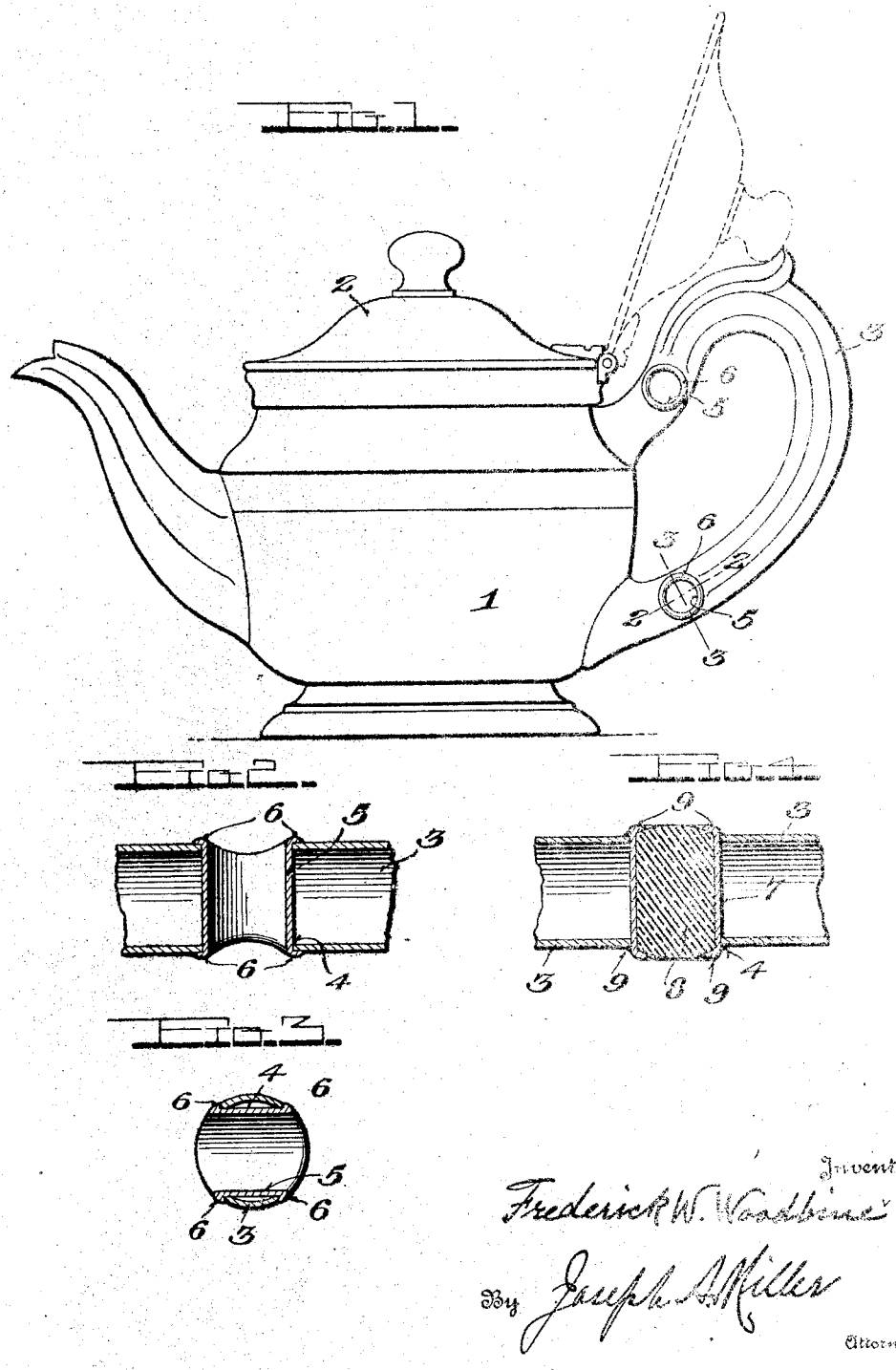

Patented Mar. 3, 1925.

1,528,730

UNITED STATES PATENT OFFICE.

FREDERICK W. WOODBINE, OF PROVIDENCE, RHODE ISLAND, ASSIGNOR TO GORHAM MFG. CO., OF PROVIDENCE, RHODE ISLAND.

INSULATING HANDLE.

Application filed May 16, 1924. Serial No. 713,720.

*To all whom it may concern:*

Be it known that I, FREDERICK W. WOODBINE, a citizen of the United States, residing at Providence, in the county of Providence and State of Rhode Island, have invented new and useful Improvements in Insulating Handles, of which the following is a specification.

This invention relates to certain new and useful improvements in insulating handles, and relates more particularly to an insulated handle therefor, the primary object of the invention being to provide an insulated handle of novel and improved form, which is effective for the purpose and can be economically produced.

A still further object of the invention is to provide an insulated handle which presents a novel and artistic appearance.

The invention has still further and other objects which will be later set forth and of themselves manifested in the course of the following description.

In the drawings:—

Figure 1 is a side elevation of a teapot with the present invention applied thereto, Figure 2 is an enlarged section on line 2—2 of Figure 1;

Figure 3 is a similar view on line 3—3 of Figure 1 and Figure 4 is a view similar to Figure 2 of a modified form of the invention.

In proceeding in accordance with the present invention a teapot is employed having a body 1 and a preferably hinged lid 2, which parts may be of any desired or preferred form. The handle 3 is of tubular formation and has its end affixed to the body 1. Holes 4 are formed through the sides of the handle at points adjacent to the body 1 and at each end portion of the handle, and inserted in these holes are tubular members 5, the ends 6 of which are bent or spun over the adjacent side portions of a handle 3 as depicted clearly in Figures 2 and 3 of the drawings, from which it will be noted that lateral transverse air passages are formed through the handle end portions, so as to prevent the transmission of heat from the body 1, to the main portion of the handle, or that part of the latter which is gripped by the hand of the user.

As shown in Figure 4 of the drawing, a tube 7 may be employed which latter may be filled with an insert of solid insulating material, such as bakelite, ivory, or other substance, the ends 9 of the tube being turned over the ends of the insulating material so as to hold the latter in position. In this form of the invention the ends of the tube 7 may be soldered or otherwise suitably secured in position in the handle 3.

From the foregoing it will be seen that in each instance the invention provides insulation which is inserted crosswise in the handle at each end portion of the latter, and adjacent to the tea pot body.

Having thus described my invention, what I claim as new and desire to secure by Letters Patent is:—

1. In combination with a teapot, a tubular handle affixed at its ends to the body of the pot and being formed with a transverse aperture adjacent each end portion of the handle and close to the pot body, and a tube conformably engaged in the aperture and secured to the handle.

2. In combination with a teapot, a tubular handle affixed at its ends to the body of the pot and being formed with a transverse aperture adjacent each end portion of the handle and close to the pot body, and a tube conformably engaged in each of the apertures and secured to the handle each tube having its ends turned outwardly and engaged with the handle walls, and having its said ends open so as to allow free circulation of air through the tubes.

3. In combination with a teapot, a tubular handle affixed at its ends to the body of the pot and being formed with a transverse aperture adjacent each end portion of the handle and close to the pot body, a tube conformably engaged in the apertures and secured to the handle, and a solid body of insulating material filling each of the tubes the ends of the latter being turned inwardly over the insulating body to secure the latter in place.

In testimony whereof I have signed my name to this specification in the presence of two subscribing witnesses.

FREDERICK W. WOODBINE.

Witnesses:
S. N. McCLARENCE,
J. A. MILLER.